United States Patent [19]
Matsuzaki et al.

[11] Patent Number: 5,687,277
[45] Date of Patent: Nov. 11, 1997

[54] MOTOR DRIVE CONTROL DEVICE WHICH USES PULSE WIDTH MODULATION TO CONTROL THE SPEED OF A MOTOR

[75] Inventors: Makoto Matsuzaki, Yokosuka; Seiichi Yasukawa, Yotsukaido, both of Japan

[73] Assignee: Nikon Corporation, Tokyo, Japan

[21] Appl. No.: 524,179

[22] Filed: Sep. 6, 1995

[30] Foreign Application Priority Data

Nov. 1, 1994 [JP] Japan ................. 6-292394

[51] Int. Cl.[6] ................................................ H02P 5/00
[52] U.S. Cl. ................................. 388/804; 318/254
[58] Field of Search .......................... 318/685, 696, 318/599, 254, 138, 439; 388/804, 811, 819

[56] References Cited

U.S. PATENT DOCUMENTS

| | | | |
|---|---|---|---|
| 5,204,593 | 4/1993 | Ueki | 318/254 |
| 5,296,792 | 3/1994 | Knierim | 318/685 |
| 5,444,622 | 8/1995 | Takeshima et al. | 364/424.05 |
| 5,469,032 | 11/1995 | Otake | 318/439 |
| 5,486,747 | 1/1996 | Welch | 318/811 |

Primary Examiner—Brian Sircus

[57] ABSTRACT

A motor drive control device which drives a motor in accordance with a pulse width modulated input signal, a first binary signal indicating a rotation direction for driving the motor and a second binary signal indicating whether drive of the motor is ON or OFF. The motor drive control device includes a logic circuit receiving the pulse width modulated input signal, the first binary signal and the second binary signal and, in response, producing a first pulse width modulated output signal and a second pulse width modulated output signal which together indicate a rotation direction and rotation speed for driving the motor.

10 Claims, 5 Drawing Sheets

5,687,277

MOTOR DRIVE CONTROL DEVICE WHICH USES PULSE WIDTH MODULATION TO CONTROL THE SPEED OF A MOTOR

BACKGROUND OF THE INVENTION

1. Field of the Invention

The present invention relates to a motor drive control device for controlling the speed of a direct-current motor. More particularly, the present invention relates to a motor drive control device which receives one pulse width modulation signal for controlling a motor and, in response, produces two separate pulse width modulation signals for respectively controlling the normal rotation direction and the reverse rotation direction of the motor.

2. Description of the Related Art

FIG. 1 illustrates a conventional motor drive control device. As illustrated by FIG. 1, a microcomputer 21 produces a motor drive control signal at an output port (PORT1) and a pulse width modulation (PWM) signal at a different output port (PWM PORT). The motor drive control signal is either a high (H) or a low (L) binary signal. The motor drive control signal at PORT1 is provided to a first input port IN1 of a motor drive control circuit 23, and the PWM signal at PWM PORT is provided to a second input port IN2 of motor drive control circuit 23. The output of motor drive control circuit 23 is supplied via output ports OUT1 and OUT2 to a motor 24.

In a conventional motor drive control device as illustrated in FIG. 1, the motor drive speed is adjusted in accordance with the PWM signal and the motor drive control signal produced by microcomputer 21. More specifically, FIG. 2 illustrates a timing chart for signals at PORT1, PWM PORT, IN1 and IN2, in accordance with the logic of the truth table of Table 1, below.

TABLE 1

| PORT 1 | PWM PORT | IN1 | IN2 |
|---|---|---|---|
| 0 | 0 | 0 | 0 |
| 0 | 1 | 0 | 1 |
| 1 | 0 | 1 | 0 |
| 1 | 1 | 1 | 1 |

In Table 1, "1" represents a high level and "0" represents a low level. When the signal at PORT1 is "0" and the signal at PWM PORT is "1", PWM drive of motor 24 is possible. When the signal at PORT1 is "1" and the signal at PWM PORT is "0", motor 24 is rotated at a constant speed. Therefore, the signals produced by microcomputer 21 allow motor 24 to be PWM driven in either the normal rotation or reverse rotation direction, but not in both directions. As a result, in a conventional motor drive control device, it is not possible to drive motor 24 by PWM drive in both the normal rotation and reverse rotation directions with only one PWM signal produced by microcomputer 21. Instead, it is necessary to use a microcomputer which can produce two PWM signals when speed adjustment of motor 24 by PWM drive is to be performed in both the normal rotation and reverse rotation directions.

SUMMARY OF THE INVENTION

Accordingly, it is an object of the present invention to provide a motor drive control device which receives only one PWM signal, but drives a motor in both the normal rotation direction and the reverse rotation direction.

In addition, it is an object of the present invention to provide a motor drive control device which receives only one PWM signal and produces two separate PWM signals for respectively driving a motor in the normal rotation direction and the reverse rotation direction.

The foregoing objects of the present invention are achieved by providing a motor drive control device which drives a motor in accordance with a pulse width modulated input signal, a first binary signal indicating a rotation direction for driving the motor and a second binary signal indicating whether drive of the motor is ON or OFF. The motor drive control device includes a logic circuit receiving the pulse width modulated input signal, the first binary signal and the second binary signal and, in response, producing a first pulse width modulated output signal and a second pulse width modulated output signal which together indicate a rotation direction and rotation speed for driving the motor.

Moreover, objects of the present invention are achieved by providing the logic circuit so that, when the received first binary signal is low, the logic circuit produces one of the first pulse width modulated output signal and the second pulse width modulated output signal to be the same as the pulse width modulated input signal, and produces the other of the first pulse width modulated output signal and the second pulse width modulated output signal to be high.

In addition, objects of the present invention are achieved by providing the logic circuit so that, when the received first binary signal is high, the logic circuit produces one of the first pulse width modulated output signal and the second pulse width modulated output signal to be the same as the pulse width modulated input signal, and produces the other of the first pulse width modulated output signal and the second pulse width modulated output signal to be high.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
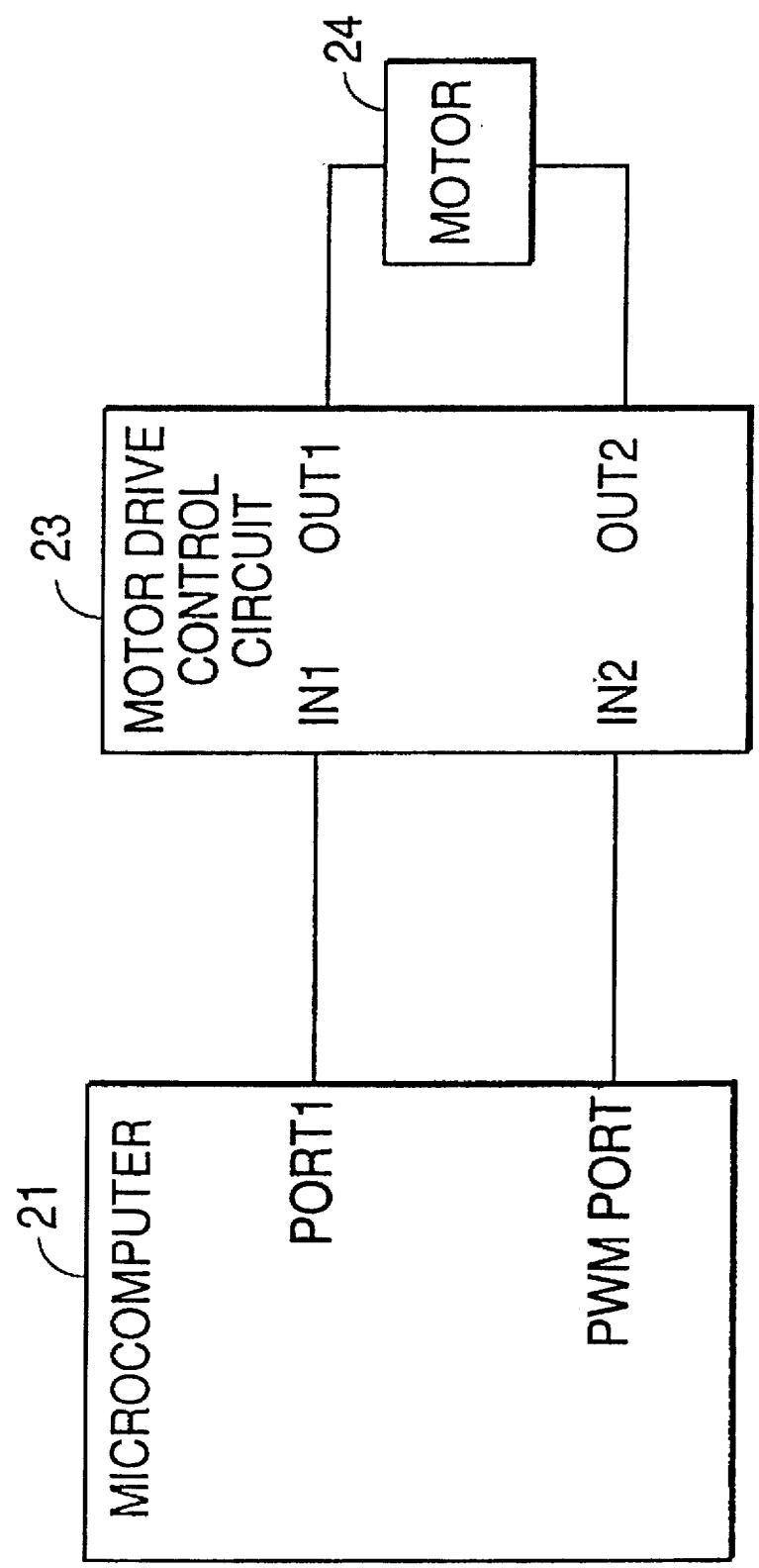
FIG. 1 (prior art) is a block diagram illustrating a conventional motor drive control device.
Figure 2:
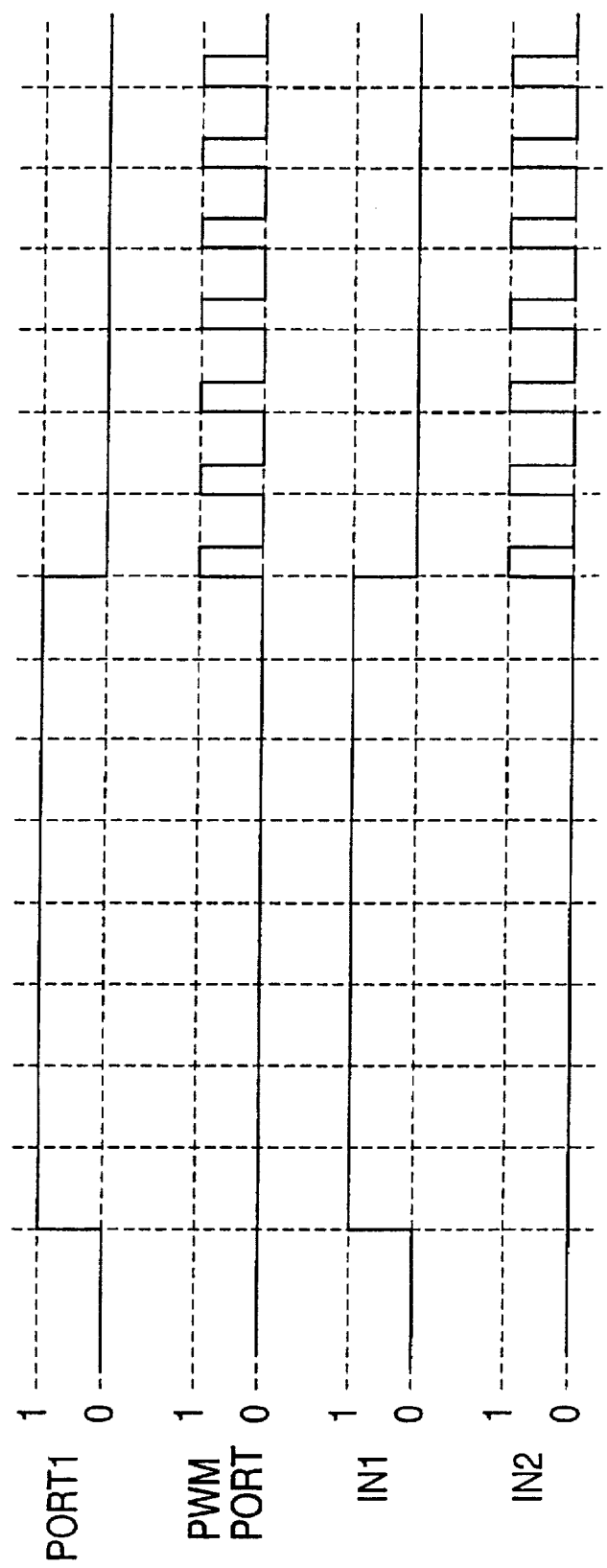
FIG. 2 (prior art) is a timing chart illustrating signals at various points in the conventional motor drive control device illustrated in FIG. 1.

Reference will now be made in detail to the present preferred embodiments of the present invention, examples of which are illustrated in the accompanying drawings, wherein like reference numerals refer to like elements throughout.

Figure 3:
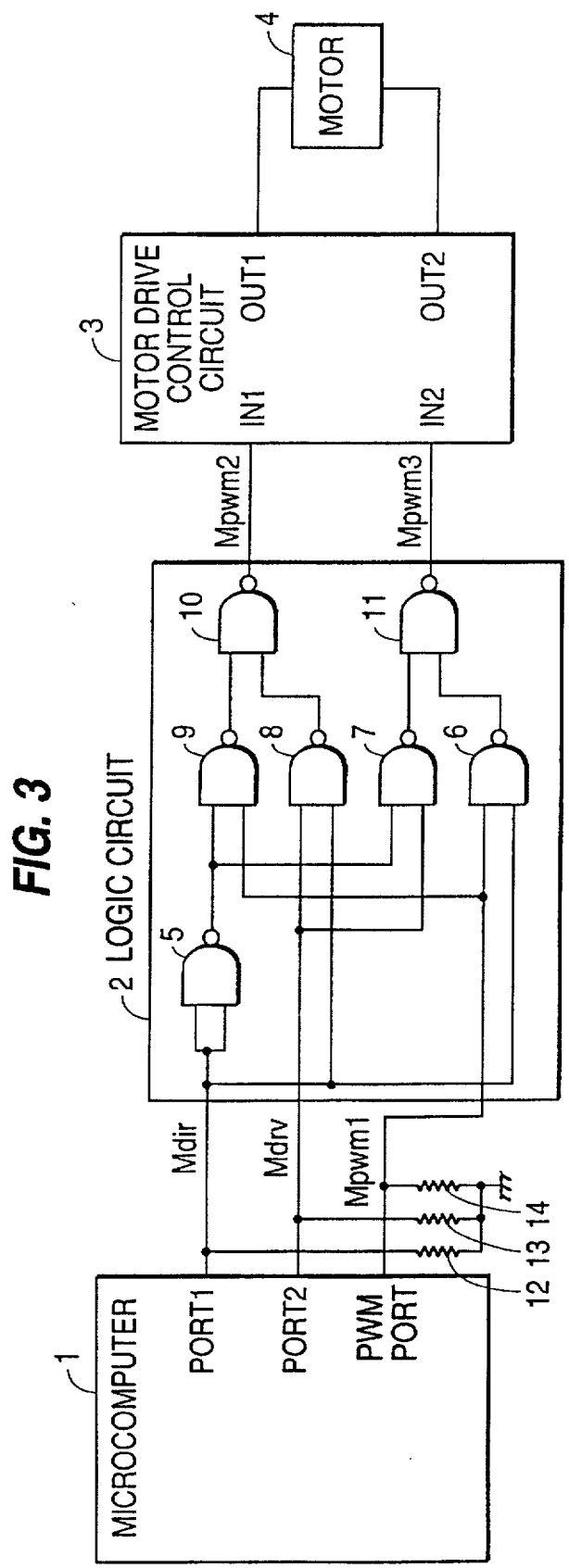
FIG. 3 is a block diagram illustrating a motor drive control device according to a preferred embodiment of the present invention.

FIG. 3 is a block diagram illustrating a motor drive control device according to an embodiment of the present invention. Referring now to FIG. 3, a microcomputer 1 produces a binary signal Mdir at an output port PORT1, a binary signal Mdrv at PORT2, and a PWM signal Mpwm1 at PWM PORT. Mdir is a binary signal for specifying the rotation direction of a motor 4. Mdrv is a drive signal for specifying whether the motor drive is ON or OFF. Mpwm1 is a pulse width modulation signal for specifying the rotation speed adjustment of motor 4.

The output of PORT1 of microcomputer 1 is connected to a pull-down resistor 12. The output of PORT2 of microcomputer 1 is connected to a pull-down resistor 13. The output of PVVM PORT of microcomputer 1 is connected to a pull-down resistor 14. Mdir, Mdrv and Mpwm1 are provided to a logic circuit 2.

Logic circuit 2 receives Mdir, Mdrv and Mpwm1 from microcomputer 1 and produces two separate pulse width modulation signals, Mpwm2 and Mpwm3. Mpwm2 produced by logic circuit 2 is provided to a first input port IN1 of a motor drive control circuit 3, and Mpwm3 produced by logic circuit 2 is provided to a second input port IN2 of motor drive control circuit 3. Outputs OUT1 and OUT2 of motor drive control circuit 3 are connected to motor 4, and motor 4 is PWM driven by motor drive control circuit 3 in both the normal rotation and reverse rotation directions.

Logic circuit 2 comprises NAND gates 5, 6, 7, 8, 9, 10 and 11 so that Mpwm2 and Mpwm3 are produced from Mdir, Mdrv and Mpwm1 as shown by the truth table illustrated in Table 2, below.

TABLE 2

|      | Mdir | Mdrv | Mpwm1 | Mpwm2 | Mpwm3 |
|------|------|------|-------|-------|-------|
| MOD1 | 0    | 0    | 0     | 0     | 0     |
|      | 0    | 0    | 1     | 1     | 0     |
|      | 0    | 1    | 0     | 0     | 1     |
|      | 0    | 1    | 1     | 1     | 1     |
| MOD2 | 1    | 0    | 0     | 0     | 0     |
|      | 1    | 0    | 1     | 0     | 1     |
|      | 1    | 1    | 0     | 1     | 0     |
|      | 1    | 1    | 1     | 1     | 1     |

More specifically, logic circuit 2 is configured as illustrated in FIG. 3 to receive Mdir, Mdrv and Mpwm1 from microcomputer 1, and to produce signals in accordance with Table 2, above, as PWM motor drive signals. Thus, NAND gate 5 receives Mdir and supplies an output to NAND gate 9 and NAND gate 7. NAND gate 9 also receives Mpwm1. Mdir and Mdrv are received by NAND gate 8. The output of NAND gate 5 and Mdrv are supplied to NAND gate 7. Mpwm1 and Mdir are supplied to NAND gate 6. The output signals of NAND gate 9 and NAND gate 8 are supplied to NAND gate 10. The output signals of NAND gate 7 and NAND gate 6 are supplied to NAND gate 11. The output signal of NAND gate 10 is provided to motor drive control circuit 3 as Mpwm2. The output signal of NAND gate 11 is provided to motor drive control circuit 3 as Mpwm3.

Figure 4:
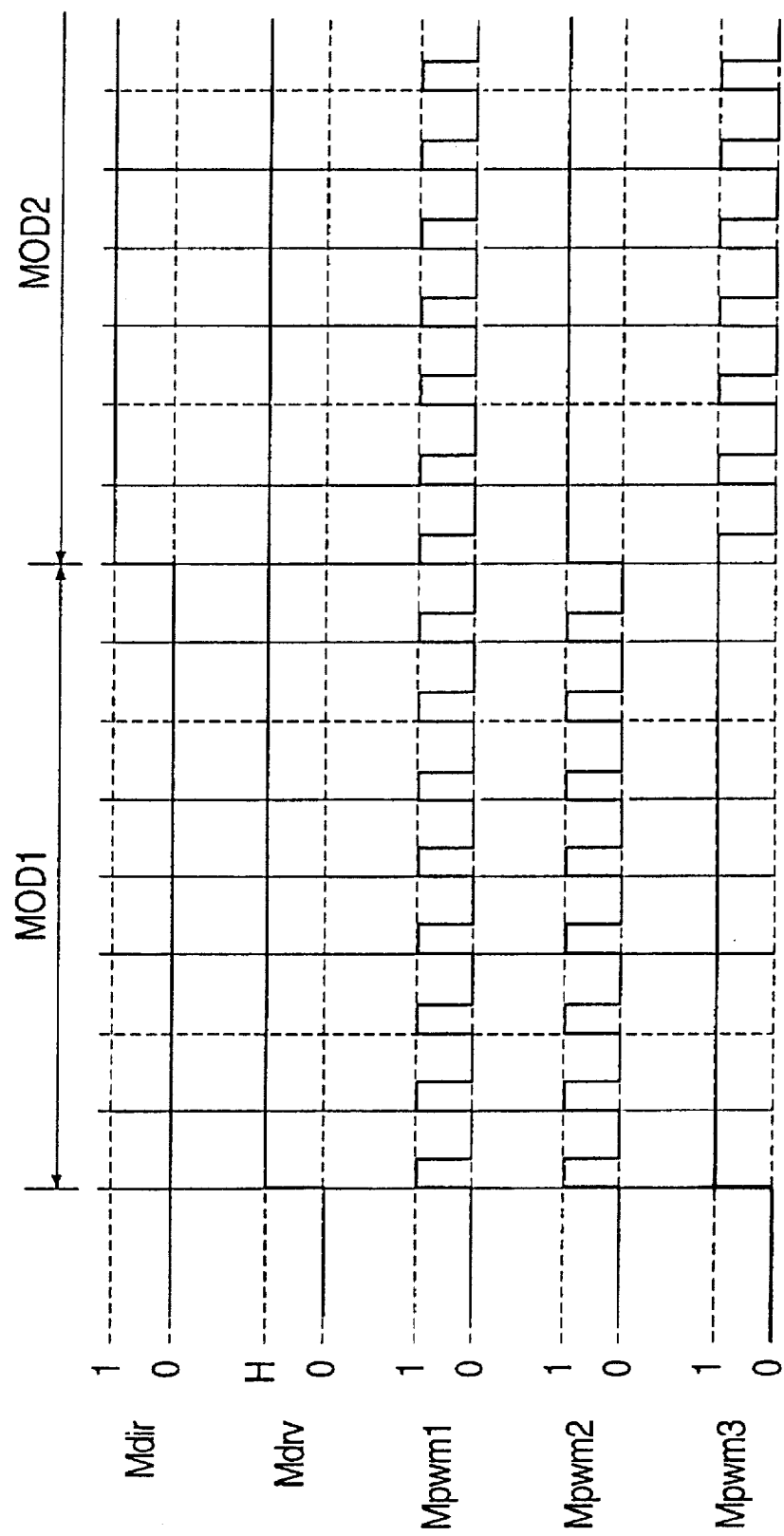
FIG. 4 is a timing chart illustrating signals at various points in the motor drive control device illustrated in FIG. 3, according to a preferred embodiment of the present invention.

FIG. 4 is a timing chart illustrating signals at various points in the motor drive control device illustrated in FIG. 3, according to an embodiment of the present invention. More specifically, FIG. 4 illustrates the timing of Mdir, Mdrv, Mpwm1, Mpwm2 and Mpwm3. Initially, as illustrated in FIG. 4, Mdir, Mdrv and Mpwm1 are all set to "0." At this time, Mpwm2 and Mpwm3 become "0." Next, as shown in the MOD1 section of FIG. 4, when Mdir is set to "0" and Mdrv fixed at "1": Mpwm2 is the same as Mpwm1, and Mpwm3 is set at "1". Also, as shown in the MOD2 section of FIG. 4, when Mdir is been set to "1" and Mdrv is fixed at "1": Mpwm3 is the same as Mpwm1, and Mpwm2 is set to "1".

In this manner, logic circuit 2 respectively supplies Mpwm2 and Mpwm3 to input ports IN1 and IN2 of motor drive control circuit 3. Since motor 4 is connected to outputs ports OUT1 and OUT2 of motor drive control circuit 3, motor 4 can be PWM driven in both the normal rotation direction and reverse rotation direction. As a result, according to the above embodiments of the present invention, control of the rotation direction of motor 4 and speed control by PWM drive is possible.

According to the above embodiments of the present invention, two binary logic signals Mdir and Mdrv are produced by microcomputer 1 and provided to logic circuit 2. Therefore, logic circuit 2 can generate two PWM motor drive signals from only one PWM motor drive signal produced by microcomputer 1, and motor 4 can be PWM driven in both the normal rotation direction and reverse rotation direction. More specifically, motor 4 can be driven in both the normal rotation direction and the reverse rotation direction even if only one PWM signal is produced by microcomputer 1.

As a result, a motor drive control device according to above embodiments of the present invention has cost reduction advantages over a conventional motor drive control device. More specifically, a conventional motor drive control device requires a microcomputer which generates two PWM signals to drive a motor in both the normal rotation direction and the reverse rotation direction. However, a motor drive control device according to the above embodiments of the present invention only requires a microcomputer to generate one PWM signal to drive a motor in both the normal rotation direction and the reverse rotation direction. Therefore, a motor drive control device according to the above embodiments of the present invention can select from among a larger selection of microcomputers for use as microcomputer 1.

In a motor drive control device according to the above embodiments of the present invention, logic circuit 2 receives a first PWM signal, Mpwm1, for performing speed control of motor 4 according to a modulated pulse width of the PWM signal. Logic circuit 2 also receives a binary signal, Mdir, which specifies the rotation direction of motor 4. Moreover, logic circuit 2 receives a binary signal, Mdrv, which is a motor drive signal indicating whether motor drive is ON or OFF. In response to the received signals Mdir, Mdrv and Mpwm1, logic circuit 2 generates a second PWM signal, Mpwm2, and a third PWM signal, Mpwm3, which together specify the rotation direction and rotation speed of motor 4 through their combination. A motor drive circuit 3 receives PWM signals Mpwm2 and Mpwm3 and generates drive signals in response thereto for controlling the rotation direction and rotation speed of motor 4.

With reference to FIG. 4, motor 4 is controlled by the signal levels of Mpwm2 and Mpwm3. Motor 4 delivers a drive force in one direction when one signal of Mpwm2 and Mpwm3 becomes "0" during a cycle of PWM of the respective signal, while the other signal of Mpwm2 and Mpwm3 is at a constant "1". Similarly, a short brake is applied to motor 4 when one signal of Mpwm2 and Mpwm3 becomes "1" during a cycle of PWM of the respective signal, while the other signal of Mpwm2 and Mpwm3 is at a constant "1". For example, motor 4 delivers a drive force in one direction when Mpwm2 becomes "0" during a PWM cycle of Mpwm2, while Mpwm3 is at a constant "1". Also, a short brake is applied when Mpwm2 becomes "1" during a PWM cycle of Mpwm2, while Mpwm3 is at a constant "1". The drive of motor 4 is controlled by controlling the amount of time in the PWM duty cycle during which the drive force is applied and during which the brake is applied. Of course, the present invention is not intended to be limited to the specific signal levels described herein and different signal levels can be used to control motor 4. For example, a short brake can be applied when one signal of Mpwm2 and Mpwm3 becomes "0", instead of applying the short brake when the signal becomes "1".

The direction of rotation of motor 4 is determined from the combination of the "1" of the signal held at the constant "1", and the "0" of the other signal. The rotation speed of motor 4 is regulated when one signal of Mpwm2 and Mpwm3 is at a constant "1", and the other signal of Mpwm2 and Mpwm3 becomes "1" during a PWM cycle of the respective signal. Of course, the present invention is not intended to be limited to these specific signal levels. For example, the rotation of motor 4 can be regulated when one signal of Mpwm2 and Mpwm3 is at a constant "0", and the other signal of Mpwm2 and Mpwm3 becomes "0". Therefore, there are many different signal levels which can be used to control motor 4. Such signal levels are easily determinable and changeable by a person skilled in the art, and the present invention is not intended to be limited to any specific signal levels.

Figure 5:
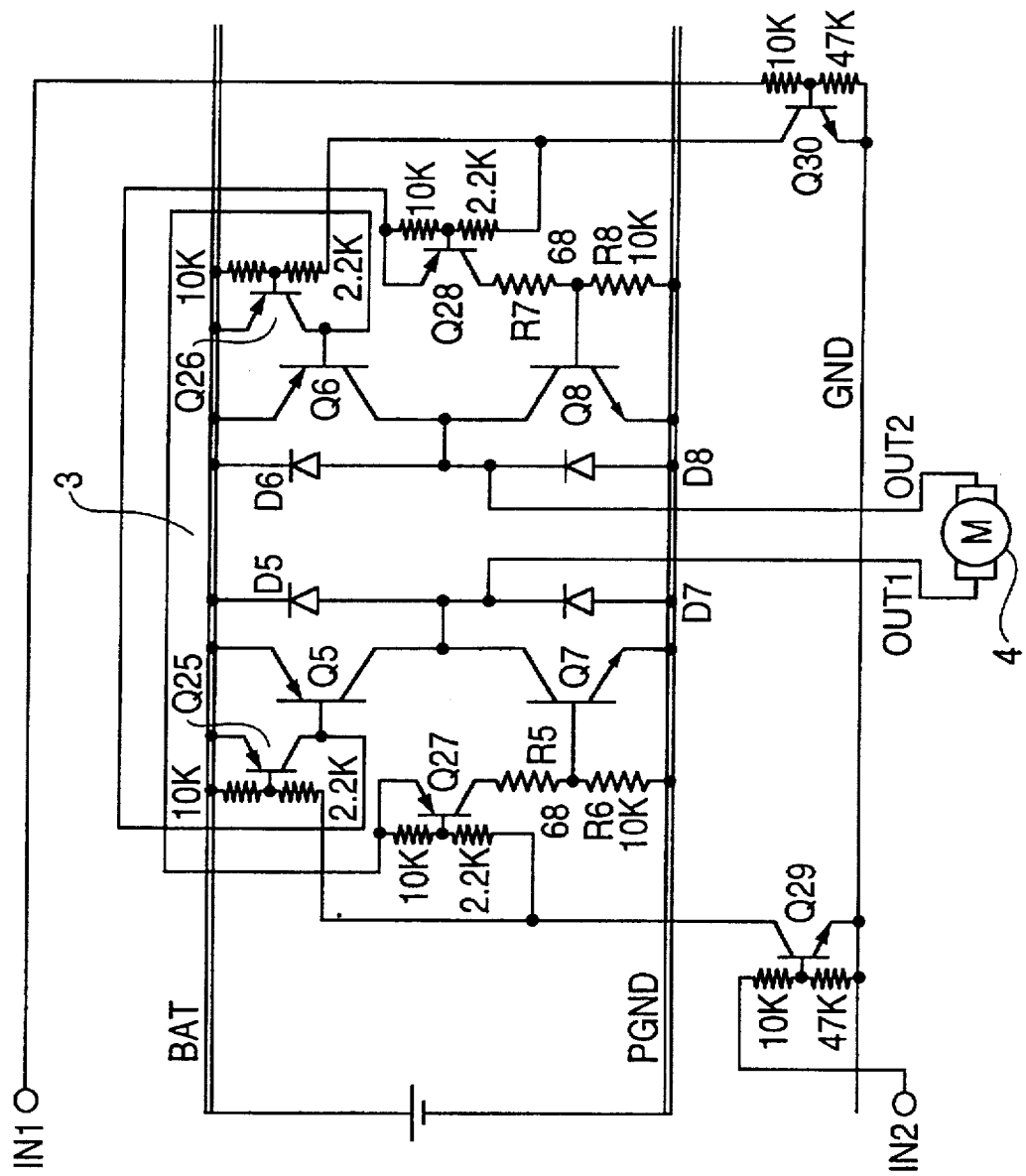
FIG. 5 is a diagram of a motor drive control circuit, according to an embodiment of the present invention.

FIG. 5 is a diagram of motor drive control circuit 3, according to an embodiment of the present invention. Motor drive control circuit 3 drives motor 4 in accordance with two different received PWM signals, such as Mpwm2 and Mpwm3. Different designs for a motor drive control circuit operable with the present invention are easily determinable by a person skilled in the art, and a person skilled in the art can easily understand the operation of motor drive control circuit 3, based on FIG. 5.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A motor drive control device which drives a motor in accordance with a pulse width modulated input signal that switches between first and second levels, a first binary signal indicating a rotation direction for driving the motor and a second binary signal indicating whether drive of the motor is ON or OFF, the motor drive control device comprising:

a logic circuit receiving the pulse width modulated input signal, the first binary signal and the second binary signal and, in response, producing first and second output signals which together indicate a rotation direction for driving the motor and whether the motor is to be in a non-braking driving state or a braking state, at least one of the first and second output signals being a pulse width modulated signal, wherein, to control a rotation speed of the motor, the pulse width modulated input signal switches between the first and second levels to thereby cause the first and second output signals to switch between indicating the non-braking driving state and the braking state, respectively.

2. A motor drive control device as in claim 1, further comprising:

a motor drive circuit which receives the first and second output signals produced by the logic circuit and, in response, generates drive signals for controlling the rotation direction and rotation speed of the motor.

3. A motor drive control device as in claim 1, wherein when the received first binary signal is low, the logic circuit produces the first output signal to be the same as the pulse width modulated input signal and produces the second output signal to be high, and when the received first binary signal is high, the logic circuit produces the second output signal to be the same as the pulse width modulated input signal and produces the first output signal to be high.

4. A motor drive control device as in claim 2, wherein when the received first binary signal is low, the logic circuit produces the first output signal to be the same as the pulse width modulated input signal and produces the second output signal to be high, and when the received first binary signal is high, the logic circuit produces the second output signal to be the same as the pulse width modulated input signal and produces the first output signal to be high.

5. A motor drive control device as in claim 1, wherein when the received first binary signal is low, the logic circuit produces one of the group comprising the first output signal and the second output signal to be the same as the pulse width modulated input signal and produces the other of the group comprising the first output signal and the second output signal to be high.

6. A motor drive control device as in claim 2, wherein when the received first binary signal is low, the logic circuit produces one of the group comprising the first output signal and the second output signal to be the same as the pulse width modulated input signal and produces the other of the group comprising the first output signal and the second output signal to be high.

7. A motor drive control device as in claim 1, wherein when the received first binary signal is high, the logic circuit produces one of the group comprising the first output signal and the second output signal to be the same as the pulse width modulated input signal and produces the other of the group comprising the first output signal and the second output signal to be high.

8. A motor drive control device as in claim 2, wherein when the received first binary signal is high, the logic circuit produces one of the group comprising the first output signal and the second output signal to be the same as the pulse width modulated input signal and produces the other of the group comprising the first output signal and the second output signal to be high.

9. A motor drive control device as in claim 1, further comprising a microcomputer producing the pulse width modulated input signal, the first binary signal and the second binary signal.

10. A motor drive control device as in claim 2, further comprising a microcomputer producing the pulse width modulated input signal, the first binary signal and the second binary signal.

* * * * *